Feb. 26, 1952          J. D. ALLYN          2,587,023
MASTER CYLINDER FOR HYDRAULIC BRAKES OR THE LIKE
Filed May 4, 1949
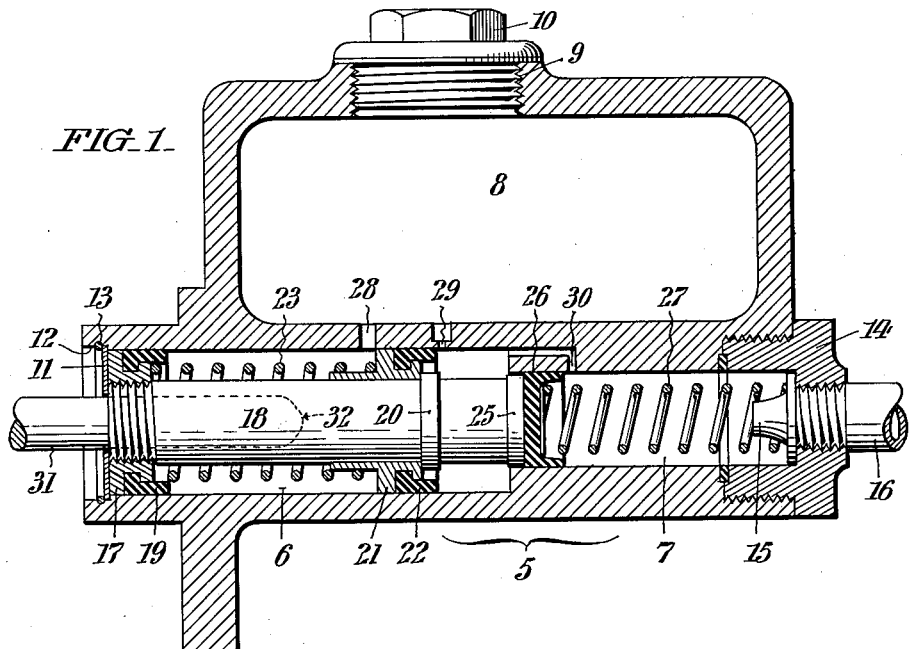
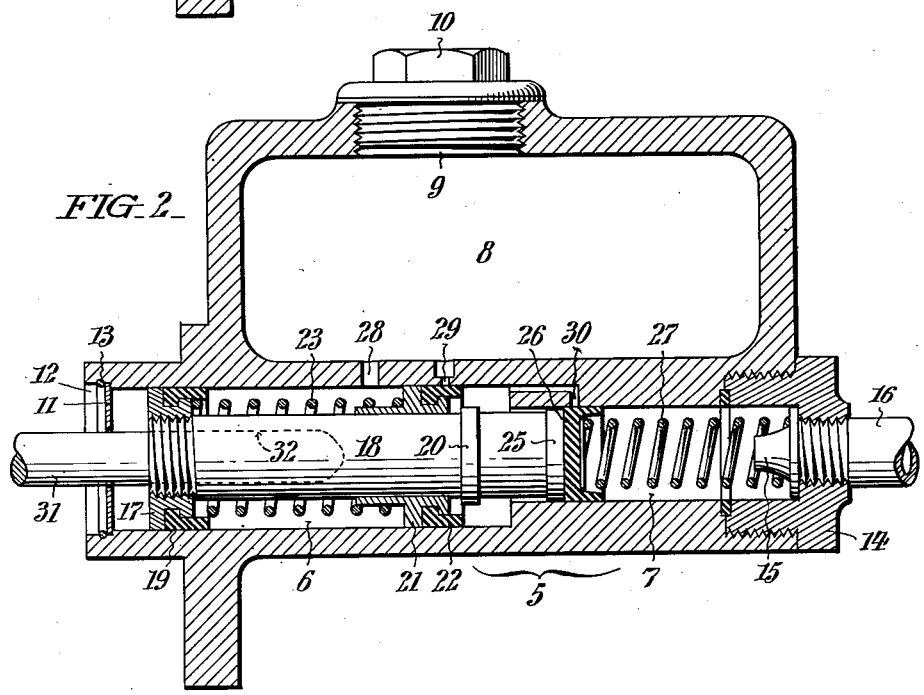
WITNESSES
INVENTOR:
Jerome D. Allyn
BY Paul & Paul
ATTORNEYS.

Patented Feb. 26, 1952

2,587,023

UNITED STATES PATENT OFFICE 2,587,023

MASTER CYLINDER FOR HYDRAULIC BRAKES OR THE LIKE

Jerome D. Allyn, Moorestown, N. J.

Application May 4, 1949, Serial No. 91,244

1 Claim. (Cl. 60—54.6)

This invention relates to master cylinders, such as are used, for example, in connection with hydraulic brake systems of automobiles and motor trucks. More specifically, it is concerned with a master cylinder of the compound type wherein the service application is initiated at a relatively low pressure and completed at a high pressure, for minimization of the manual effort required in the operation.

The chief aim of my invention is to provide a compound master cylinder characterized by having an initial large volume fluid displacement at low pressure and a subsequent small volume at high pressure, and requiring but a small operating force.

A further aim is to provide a master cylinder, having the above attributes, which is simple in construction and reliable in operation; in which the transfer from the low pressure phase to the high pressure phase of operation is accomplished smoothly and without relief of the fluid pressure on the low pressure piston; and by which the operation is accomplished by a relatively short limited piston stroke.

Other objects and attendant advantages will appear from the following detailed description of the attached drawing, wherein Fig. 1 is a view in longitudinal section, of a master cylinder conveniently embodying my invention, with its piston means shown in normally retracted or inactive position; and Fig. 2 is a similar view with the piston means advanced for brake application.

With more detailed reference to these illustrations, the numeral 5 comprehensively designates the cylinder which has a bore 6 of large diameter at the rear end, and an axially-aligned bore 7 at the front end. Integrally formed with the cylinder 5 at the top is a storage reservoir 8 for the fluid used in the system, the same having a filling opening at 9 which is sealed by a removable screw plug 10. The large bore 6 of the cylinder 5 is closed at the outer end by a disk 11 which is seated in a counter bore at 12, and held in place by a split spring retaining ring 13. Screwed into the outer end of the small bore of the cylinder 5 is a conventional check valve 14 into the axial passage of which is connected the piping 16 that leads to the application cylinders (not illustrated) at the respective wheel brakes of the vehicles.

Disposed within the large bore of the cylinder 5 and normally abutting the disk 11 as in Fig. 1, is a piston 17 which is screw-connected to the rear end of a rod 18, and with which is incorporated a cup washer 19 for maintenance of fluid tightness within said bore. Slidably mounted with a fluid-tight fit on the rod 18 within the bore 6 and normally in engagement with an annular stop shoulder 20 on said rod, is an auxiliary or floating piston 21 with a similarly incorporated cup washer 22. A helical spring 23 surrounding the rod 18 and in compression between the piston 17 and the auxiliary piston 21, serves to keep the latter normally engaged with the stop shoulder 20 as in Fig. 1. The rod 18 terminates in an end enlargement 25 which extends, with a slight circumferential clearance, part way into the front end of the small bore 7 of the cylinder 5 to serve as a piston head in the latter bore, and backed against said head is a frontally open flexible cup 26. As shown this cup 26 is held to the end of rod 20 by a coiled spring 27 in compression between it and the flow control member 15 of the check valve 14. The portion of the large bore 6 of cylinder 5 rearward of the auxiliary piston 21 is at all times in communication with the reservoir 8 by way of a port 28, while the portion ahead of said piston is normally in communication with said reservoir by way of a restricted port at 29. A duct 30 in the wall of the cylinder provides communication between the front end of the large bore 6 and the rear end of the small bore 7 normally, i. e. when the piston rod assembly is in its fully retracted position. The usual operating thrust rod shown at 31 extends from the brake pedal (not illustrated) through a central clearance opening in the closure disk 11 and into an axial socket recess 32 in the rear end of the piston rod 18.

Operation

As the piston rod 18 is advanced through rightward thrust of the actuating rod 31 by means of the brake pedal, the large piston 17, the auxiliary piston 21 and the small or high pressure piston 26 will be shifted together as a unit in the same direction for a time, with the attendant closing of the ports 29 and 30 and trapping of the fluid then in the fore portion of the large bore 6 as well as in the small bore 7 as in Fig. 2. Since the auxiliary piston 21 has a greater displacement than the high pressure piston head 25, some fluid will be forced through the circumferential clearance around said head from the forward end of the large bore 6 past the flexible cup 26 and into the small bore 7. When the fluid pressure in the system overcomes the resistance of the spring 23, the auxiliary piston 21 will remain stationary and thereafter serve as a pressure and volume regulating element for maintenance of a constant volume of the fluid in the forward end of the large bore 6. As the piston rod 18 continues in its advance, the forward movement of the cup 26 builds up a high pressure in the fluid trapped in the small bore 7 of the cylinder for delivery past the check valve 15 into the pipe 16 and for final application of the brakes. Since the fluid pressure is not relieved from the front end of the large bore 6 during brake application, the transition from the low pressure phase to the high pressure phase is accomplished smoothly and evenly without perception by the driver of the vehicle.

It is to be particularly noted that the cup 26 acts after the manner of a check valve in that it allows fluid to pass from the large bore 6 into the small bore 7 during the initial phase of brake application, and in that it prevents back flow of fluid from said small bore to said large bore as the pressure builds up in the small bore during the final phase of the operation.

Upon release of the brake pedal, the piston rod 18 is automatically restored to the normal position of Fig. 1 by the spring 27 which exerts its force rearwardly upon the piston rod assembly. Eventually the auxiliary piston 21 will be caused to assume its normal position in turn, under the influence of spring 23. During the restoration to normal, the fluid pressure in the bores 6 and 7 will be relieved as the auxiliary piston 21 and the cup 26 of the small piston pass leftward beyond the port 29 and the mouth of the duct 30, respectively.

Having thus described my invention, I claim:

A master cylinder, for hydraulic brake systems, having a large bore and a small bore, and a storage reservoir thereabove for brake actuating fluid; a normally retracted main piston in the rear portion of the large bore; a rod extending axially from the piston partway into the small bore and provided with a stop shoulder medially of its length; an auxiliary piston slidably mounted on the rod for operation in the fore portion of the large bore; a helical spring surrounding the rod and in compression between the main and the auxiliary piston to maintain the latter yieldingly in engagement with the stop shoulder on the rod; a cupped sealing element of flexible material abutting the end of the rod extension within the small bore; a compression spring in the small bore with one end bearing upon the front end wall of the cylinder and the other end engaged within the hollow of the sealing element; a check valve for controlling outflow from the small bore; a port affording communication at all times between the rear portion of the large bore and the reservoir; a second port normally affording communication between the front end of the large bore and the reservoir but adapted to be closed by the auxiliary piston at an intermediate stage in the advance of the main piston during brake application, and a by-pass duct normally affording communication between the front end of the large bore and the contiguous end of the small bore, adapted to be closed by the sealing element as the rod is further advanced in brake application.

JEROME D. ALLYN.

REFERENCES CITED

The following references are of record in the file of this patent:

UNITED STATES PATENTS

| Number | Name | Date |
| --- | --- | --- |
| 1,673,528 | Pigeolet | June 12, 1928 |
| 2,009,105 | Carroll | July 23, 1935 |
| 2,161,659 | Shepard | June 6, 1939 |
| 2,166,742 | Lambert | July 18, 1939 |
| 2,317,601 | Fowler | Apr. 27, 1943 |